United States Patent [19]
Saito et al.

[11] Patent Number: 5,637,648
[45] Date of Patent: Jun. 10, 1997

[54] FLUORINE-CONTAINING ELASTOMER COMPOSITION

[75] Inventors: Satoru Saito, Kitaibaraki; Haruyoshi Tatsu, Hitachi, both of Japan; Sergei V. Sokolov; Alexandre N. Kollar, both of Saint Petersburg, Russian Federation; Sergei R. Sterlin, Moscow, Russian Federation; Yurii V. Zeifman, Moscow, Russian Federation; Sergei A. Postovoi, Moscow, Russian Federation

[73] Assignee: Nippon Mektron Limited, Tokyo, Japan

[21] Appl. No.: 678,092

[22] Filed: Jul. 11, 1996

[30] Foreign Application Priority Data

Jul. 13, 1995 [JP] Japan ................. 7-200358

[51] Int. Cl.⁶ .................. C08L 5/29; C08L 27/18
[52] U.S. Cl. .................. 525/326.3; 524/195; 525/326.4
[58] Field of Search .................. 524/195; 525/326.3, 525/326.4; 564/226

[56] References Cited

FOREIGN PATENT DOCUMENTS

| | | | |
|---|---|---|---|
| 606883 | 7/1994 | European Pat. Off. | 525/326.3 |
| 59-109546 | 6/1959 | Japan . | |
| 59-217749 | 12/1984 | Japan | 525/326.3 |

OTHER PUBLICATIONS

Henry C. Brown et al. "Reactions of the Perfluoroalkylnitriles, III. Perfluoroalkylhydrazidines and Perfluoroalkyl--N-aminotriazoles," J. Am. Chem. Soc., vol. 82, pp. 4700–4703 (Sep. 1960).

*Primary Examiner*—Veronica P. Hoke
*Attorney, Agent, or Firm*—Barnes & Thornburg

[57] ABSTRACT

A fluorine-containing elastomer composition comprising a fluorine-containing elastomer having a cyano group as a cross-linkable group and a bisamidrazone compound represented by the following general formula as a vulcanizing agent:

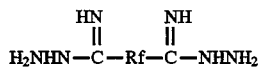

wherein Rf is one of the following groups:

$(CF_2)_m$, $CFX(OCF_2CFX)_mO(CF_2)_n$ and $CFX(OCF_2CFX)_pO(CF_2)_nO(CFXCF_2O)_qCFX$ has considerably improved roll kneadability and processability during the vulcanization-molding, and gives vulcanization products having good heat resistance and solvent resistance.

7 Claims, No Drawings

FLUORINE-CONTAINING ELASTOMER COMPOSITION

BACKGROUND OF THE INVENTION

1. Field of the Invention

The present invention relates to a fluorine-containing elastomer composition, and more particularly to a fluorine-containing elastomer composition, which comprises a fluorine-containing elastomer having a cyano group as a cross-linkable group and a new type of a vulcanizing agent.

2. Related Prior Art

JP-A-59-109546 discloses a fluorine-containing elastomer composition, which comprises a terpolymer of tetrafluoroethylene, perfluoro(methyl vinyl ether) and perfluoro unsaturated nitrile compound represented by the following general formula:

where n=1 to 2; m=1 to 4, and a bis(aminophenyl) compound represented by the following general formula as a curing agent:

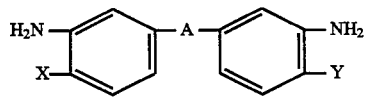

wherein A is an alkylidene group having 1 to 6 carbon atoms, a perfluoroalkylidene group having 1 to 10 carbon atoms, a $SO_2$ group, an O group, a CO group or a carbon—carbon bond directly linking with two benzene rings; X and Y each are a hydroxyl group or an amino group.

The present inventors found that a vulcanization product having good heat resistance and solvent resistance was successfully obtained by using a novel bisamidrazone represented by the following general formula as a vulcanizing agent for a fluorine-containing elastomer having a cyano group as a cross-linkable group:

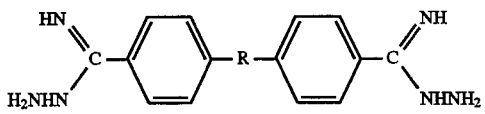

wherein R is an alkylidene group having 1 to 6 carbon atoms, preferably an isopropylidene group or a perfluoroalkylidene group having 1 to 10 carbon atoms, preferably a perfluoroisopropylidene group (Japanese Patent Application No. 6-282943).

However, as a result of further study it was found that the latter fluorine-containing elastomer composition still had a problem of processability. That is, during the preparation of a fluorine-containing elastomer composition comprising a fluorine-containing elastomer having a cyano group and the above-mentioned bisamidrazone as essential components, there sometimes happen such cases that scorching takes place or neither vulcanization products having desired physical properties nor vulcanization-molding products having a smooth surface are obtained, depending on the viscosity or the cross-linking group structure of fluorine-containing elastomer, kneading temperature, shearing spead or shearing force of roll mill or the like. When the viscosity of kneaded mixture is relatively high, a flow failure is sometimes encountered during the press molding.

SUMMARY OF THE INVENTION

An object of the present invention is to provide a fluorine-containing elastomer composition, which comprises a fluorine-containing elastomer having a cyano group as a cross-linkable group and a bisamidrazone compound as a new type of curing agent and is capable of producing vulcanization products having desired physical properties and being freed from the problem of processability.

According to the present invention, there is provided a fluorine-containing elastomer composition, which comprises a fluorine-containing elastomer having a cyano group as a cross-linkable group and a bisamidrazone compound represented by the following general formula as a vulcanizing agent:

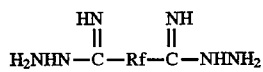

wherein Rf is one of the following groups:

where n=1 to 10, $CFX(OCF_2CFX)mO(CF_2)n$, where X=F or $CF_3$; n=1 to 10, m=1 to 2 and

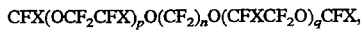

where X=F or $CF_3$; n=1 to 10; p+q=8.

DETAILED DESCRIPTION OF THE INVENTION

The bisamidrazone compound for use in the present invention can be readily prepared by reaction of the corresponding dinitrile compound with hydrazine hydrate [J. Am. Chem. Soc., vol. 82, page 4700 (1960)].

The thus prepared bisamidrazone compound is used as a vulcanizing agent for the fluorine-containing elastomer having a cyano group as a cross-linkable group. A terpolymer comprising about 45 to 75% by mole of tetrafluoroethylene, about 50 to about 25% by mole of perfluoro(lower alkyl vinyl ether) or perfluoro(lower alkoxy-lower alkyl vinyl ether) and about 0. 1 to 5% by mole of a perfluoro unsaturated nitrile compound, the sum total being 100% by mole, is usually used as such a fluorine-containing elastomer.

As a perfluoro(lower alkyl vinyl ether), perfluoro(methyl vinyl ether) is usually used. As a perfluoro(lower alkoxy-lower alkyl vinyl ether), for example, the following ethers are used:

| | |
|---|---|
| $CF_2=CFOCF_2CF(CF_3)OC_nF_{2n+1}$ | (n = 1 to 5) |
| $CF_2=CFO(CF_2)_3OC_nF_{2n+1}$ | (n = 1 to 5) |
| $CF_2=CFOCF_2CF(CF_3)O(CF_2O)_mC_nF_{2n+1}$ | (n = 1 to 5, m: 1 to 3) |
| $CF_2=CFO(CF_2)_2OC_nF_{2n+1}$ | (n = 1 to 5) | where the ethers, particularly whose $C_nF_{2n+1}$ group is a $CF_3$ group, are preferably used.

As a perfluoro unsaturated nitrile compound as a cross-linking site monomer, the following compounds are used:

| | |
|---|---|
| $CF_2=CFO(CF_2)_nOCF(CF_3)CN$ | (n = 2 to 5) |
| $CF_2=CFO[OCF_2CF(CF_3)]_nO(CF_2)_mCN$ | (n = 1 to 2, m: 1 to 6) |
| $CF_2=CFO(CF_2)_nCN$ | (n = 1 to 8) |

CF$_2$=CF[OCF$_2$CF(CF$_3$)]$_n$OCF$_2$CF(CF$_3$)CN   (n = 1 to 2)

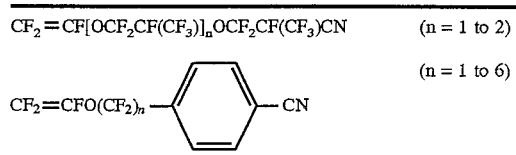   (n = 1 to 6)

The terpolymer comprising the foregoing components as essential can be further copolymerized with fluorinated olefins or various vinyl compounds to such a degree as not to inhibit the copolymerization reaction and impair the physical properties of vulcanization products (i.e. to not more than about 20% by mole). Fluorinated olefins for use in the present invention include, for example, vinylidene fluoride, monofluoroethylene, trifluoroethylene, trifluoropropylene, pentafluoropropylene, hexafluoropropylene, hexafluoroisobutylene, chlorotrifluoroethylene, dichlorodifluoroethylene, etc. Vinyl compounds for use in the present invention include, for example, ethylene, propylene 1-butene, isobutylene, methyl vinyl ether, ethyl vinyl ether, butyl vinyl ether, cyclohexyl vinyl ether, vinyl acetate, vinyl propionate, vinyl chloride, vinylidene chloride, trifluorostyrene, etc.

About 0.1 to abut 5 parts by weight, preferably about 0.2 to about 3 parts by weight, of the bisamidrazone compound represented by the foregoing general formula is used as a vulcanizing agent per 100 parts by weight of the terpolymer.

The fluorine-containing elastomer composition comprising the foregoing components as essential can further contain appropriate ingredients, when required, for example, an inorganic filler such as carbon black, silica, etc.; an acid receptor such as divalent metal oxides or hydroxides including lead (II) oxide, zinc oxide, magnesium hydroxide, calcium hydroxide, etc., hydrotalcite, etc.; a pigments; a processing aidditive; a plasticizers, etc. The composition can be prepared by heading through rolls, a kneader, Bambury mixer, etc. The composition is cured by heating at a temperature of about 150° to about 220° C. for about 5 to about 60 minutes in a compression molding machine, etc. Post curing (secondary vulcanization) is carried out at a temperature of about 200° to about 320° C. for about 10 to about 70 hours. To obtain vulcanization products having good physical properties, it is preferable to conduct the secondary vulcanization in an inert gas atmosphere such as a nitrogen gas atmosphere, etc.

According to the present invention vulcanization products having not only good heat resistance and solvent resistance, but also considerably improved roll kneadability and processability during the vulcanization-molding can be obtained from a fluorine-containing elastomer having a cyano group as a cross-linkable group. The minimum torque shows a low figure at the vulcanization. Thus, the present fluorine-containing elastomer composition is effectively utilized as a material for vulcanization-molding of O-rings, sheets, etc. to be used under severe conditions.

PREFERRED EMBODIMENTS OF THE INVENTION

The present invention will be described in detail below, referring to Examples.

REFERENCE EXAMPLE 1

14.4 g of perfluoroadipic acid dinitrile was dropwise added to a mixture consisting of 10 ml of ethanol and 20 ml of hydrazine hydrate, while maintaining the temperature of not more than 20° C. with stirring. After the dropwise addition, stirring was continued for further 2 hours. The resulting precipitates were recovered by filtration, washed with water, and dried in a P$_2$O$_5$ desiccator under reduced pressure, whereby 16.3 g of perfluoroadipic acid bisamidrazone having a melting point of 131° C., represented by the following formula, was obtained as a white solid (yield: 90%):

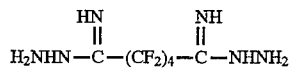

Elemental analysis (C$_6$H$_8$F$_8$N$_5$)

Found: C 23.01%, H 2.44%, F 47.94%, N 26.75% Calculated: C 22.79%, H 2.53%, F 48.03%, N 26.58%

REFERENCE EXAMPLE 2

20 g of perfluorosuberic acid bisamidrazone having a melting point of 186° C. (decomposition), represented by the following formula, was obtained as a white solid (yield: 85%) in the same manner as in Reference Example 1, except that 20 g of perfluorosuberic acid dinitrile was used in place of perfluoroadipic acid dinitrile:

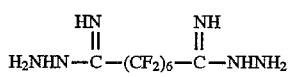

Elemental analysis (C$_8$H$_8$F$_{12}$N$_6$)

Found: C 23.08%, H 2.04%, F 55.00%, N 19.63% Calculated: C 23.09%, H 1.94%, F 54.78%, N 20.19%

REFERENCE EXAMPLE 3

17 g of a corresponding bisamidrazone compound was obtained as a light yellow oily substance (yield: 82%) in the same manner as in Reference Example 1, except that 20 g of a compound represented by the following formula was used in place of perfluoroadipic acid dinitrile:

NCCF(CF$_3$)[OCF$_2$CF(CF$_3$)]$_n$O(CF$_2$)$_3$O[CF(CF$_3$)CF$_2$O]$_m$CF(CF$_3$)CN  (n+m=5)

Elemental analysis (C$_{24}$H$_8$O$_7$F$_{44}$N$_5$)

Found: C 22.24%, H 0.82%, F 62.55% Calculated: C 21.68%, H 0.60%, F 62.72%

EXAMPLES 1 TO 4

To 100 parts by weight of terpolymer of tetrafluoro-ethylene-perfluoro(methyl vinyl ether)-perfluoro(3,7-dioxa-8-cyano-1-nonene) in a molar ratio of 63.5:34.9:1.6 [Copolymer A; ηsp/c: 0.59 dl/g, measured at 35° C. after dissolution of 0.1 g of Copolymer A in 100 ml of a solvent mixture of perfluoro(2-butyltetrahydrofuran)/perfluoro(2,2,3-trichlorobutane)/ethylene glycol dimethyl ether in a volume ratio 40:60:3] were added one of the following bisamidrazone compounds and carbon black in the following proportions:

| | |
|---|---|
| Bisamidrazone compound of Reference Example 1: | 0.4 parts by weight (Example 1) |
| Bisamidrazone compound of Reference Example 1: | 0.6 parts by weight (Example 2) |
| Bisamidrazone compound of Reference Example 2: | 0.6 parts by weight (Example 3) |

| | |
|---|---|
| Bisamidrazone compound of Reference Example 3: | 2.0 parts by weight (Example 4) |
| MT carbon black: | 20 parts by weight (Examples 1 to 4) |

The mixtures were each kneaded through a two-roll mill at a temperature of 40° to 45° C., and the resulting kneaded mixtures were then subjected to press vulcanization (primary vulcanization) at 180° C. for 30 minutes and then to oven vulcanization (secondary vulcanization) in a nitrogen gas atmosphere under the following conditions:

Heating at 90° C. for 4 hours,

Heating temperature elevation from 90° C. to 204° C. over 6 hours,

Heating at 204° C. for 18 hours,

Heating temperature elevation from 204° C. to 288° C. over 6 hours and

Heating at 288° C. for 18 hours.

EXAMPLES 5 TO 7

In Example 1, 3 and 4, a terpolymer of tetrafluoroethylene-perfluoro(methyl vinyl ether)-perfluoro(3-oxa-8-cyano-1-octene) in a molar ratio of 68.8:30.0:1.2 (Copolymer B) was used in place of Copolymer A.

COMPARATIVE EXAMPLE 1

In Example 1 using Copolymer A, 0.7 parts by weight of bisamidrazone of 2,2-bis(4-carboxyphenyl) hexafluoropropane represented by the following formula was used in place of perfluoroadipic acid bisamidrazone obtained in Reference Example 1:

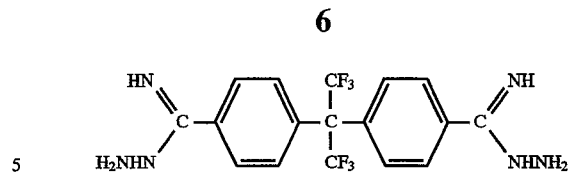

COMPARATIVE EXAMPLE 2

In Example 5 using Copolymer B, 0.5 parts by weight of bisamidrazone of 2,2-bis(4-carboxyphenyl) hexafluoropropane was used in place of perfluoroadipic acid bisamidrazone obtained in Reference Example 1.

In the foregoing Examples 1 to 7 and Comparative Examples 1 and 2, measurements and evaluation were made for the following items:

Cure rate: A minimum torque and a torque 25 minutes thereafter were measured by JSR (Japan Synthetic Rubber Co., Ltd.) curelastometer at 180° C.

Flow at molding: Flow behavior of gum stock at press molding of P-24 O-ring was evaluated Post cured properties: Tensile properties were measured according to DIN 53504 and 53505

Heat resistance: Tensile properties were measured according to DIN 53504 and 53505 after aging at 300° C. for 70 hrs.

Compression set: Compression set was measured at 275° C. or 300° C. for 70 hrs. according to ASTM Method-B using P-24 O-ring Hexamethylenediamine resistance: Volumic swelling was measured after immersion in hexamethylenediamine at 140° C. for 70 hrs.

Water resistance: Volumic swelling was measured after immersion in water at 200° C. for 70 hrs. under pressure Results are shown in the following Table.

TABLE

| Measurement, evaluation | Example | | | | | | | Comp. Ex. | |
|---|---|---|---|---|---|---|---|---|---|
| | 1 | 2 | 3 | 4 | 5 | 6 | 7 | 1 | 2 |
| [Cure rate] | | | | | | | | | |
| Minimum torque (kg · cm) | 6.9 | 7.6 | 5.7 | 5.4 | 5.9 | 5.2 | 6.0 | 8.2 | 10.5 |
| After 25 min. (kg · cm) | 11.0 | 14.0 | 10.5 | 8.5 | 11.5 | 10.6 | 10.8 | 13.7 | 14.1 |
| [Flow at molding] | | | | | | | | | |
| Poor flow | ← | | | None | | | → | Occurred | |
| [Post cured properties] | | | | | | | | | |
| Hardness (Shore-A) | 67 | 69 | — | 69 | 73 | — | 74 | 68 | 75 |
| 100% modulus* (MPa) | 4.5 | 7.2 | — | 4.5 | 7.4 | — | 7.4 | 5.4 | 9.3 |
| Strength** (MPa) | 18.9 | 19.8 | — | 21.3 | 22.7 | — | 24.6 | 20.6 | 21.6 |
| Elongation*** (%) | 190 | 150 | — | 210 | 170 | — | 180 | 200 | 160 |
| [Heat resistance] | | | | | | | | | |
| Hardness (Shore-A) | 66 | 67 | — | 65 | 71 | — | 70 | 66 | 74 |
| 100% modulus* (MPa) | 3.2 | 4.8 | — | 2.9 | 5.5 | — | 5.2 | 3.8 | 8.0 |
| Strength** (MPa) | 16.1 | 18.2 | — | 17.5 | 22.0 | — | 22.3 | 19.4 | 21.4 |
| Elongation*** | 240 | 190 | — | 270 | 200 | — | 180 | 230 | 190 |

TABLE-continued

| Measurement, evaluation | Example 1 | 2 | 3 | 4 | 5 | 6 | 7 | Comp. Ex. 1 | 2 |
|---|---|---|---|---|---|---|---|---|---|
| (%) [Compression set] | | | | | | | | | |
| 275° C. (%) | 38 | 19 | 34 | 41 | 29 | 30 | 29 | 28 | |
| 300° C. (%) | 40 | 21 | 38 | 49 | 36 | 32 | 34 | 32 | 35 |
| [Diamine resistance] | | | | | | | | | |
| Vol. swelling (%) | 34.06 | 38.0 | 36.5 | 44.0 | 30.2 | 30.1 | 44.0 | 42.6 | 22.8 |
| [Water resistance] | | | | | | | | | |
| Vol. swelling (%) | 3.2 | 0.8 | 3.1 | 3.2 | 4.6 | 4.2 | 3.2 | 1.2 | 3.6 |

*Tensile modulus at 100% strain
**Tensile strength
***Elongation at break

What is claimed is:

1. A fluorine-containing elastomer composition, which comprises a fluorine-containing elastomer having a cyano group as a cross-linkable group and a bisamidrazone compound represented by the following general formula as a vulcanizing agent:

$$\underset{H_2NHN-C-Rf-C-NHNH_2}{\overset{HN\quad\quad NH}{\|\quad\quad\|}}$$

wherein Rf is one of the following groups:

$(CF_2)_n$, where n=1 to 10, $CFX(OCF_2CFX)_mO(CF_2)_n$, where X=F or $CF_3$; n=1 to 10, m=1 to 2 and $CFX(OCF_2CFX)_pO(CF_2)_nO(CFXCF_2O)_qCFX$, where X=F or $CF_3$; n=1 to 10; p+q=8.

2. A fluorine-containing elastomer composition according to claim 1, wherein the fluorine-containing elastomer having a cyano group as a cross-linkable group is a terpolymer comprising about 45 to about 75% by mole of tetrafluoroethylene, about 50 to abut 25% by mole of perfluoro(lower alkyl vinyl ether) or perfluoro(lower alkoxy-lower alkyl vinyl ether) and abut 0.1 to 5% by mole of a perfluoro unsaturated nitrile compound, the sum total being 100% by mole.

3. A fluorine-containing elastomer composition according to claim 1, wherein the bisamidrazone compound is $$\underset{H_2NHN-C-(CF_2)_4-C-NHNH_2}{\overset{HN\quad\quad NH}{\|\quad\quad\|}}.$$

4. A fluorine-containing elastomer composition according to claim 1, wherein the bisamidrazone compound is $$\underset{H_2NHN-C-(CF_2)_6-C-NHNH_2}{\overset{HN\quad\quad NH}{\|\quad\quad\|}}.$$

5. A fluorine-containing elastomer composition according to claim 1, wherein the Rf radical of the bisamidrazone compound is derived from $NCCF(CF_3)[OCF_2CF(CF_3)]_nO(CF_2)_3O[CF(CF_3)CF_2O]_mCF(CF_3)CN$ where n+m=5.

6. A fluorine-containing elastomer composition according to claim 1, wherein about 0.1 to about 5 parts by weight of the bisamidrazone compound is used per 100 parts by weight of the fluorine-containing elastomer.

7. A fluorine-containing elastomer composition according to claim 1, wherein about 0.2 to about 3 parts by weight of the bisamidrazone compound is used per 100 parts by weight of the fluorine-containing elastomer.

* * * * *